United States Patent Office 3,360,333
Patented Dec. 26, 1967

3,360,333
FLUOR-MICAS AND FLUOR-AMPHIBOLES AND METHODS FOR MAKING SAME
Kenneth H. Ivey, Norris, Tenn., assignor to the United States of America as represented by the Secretary of the Interior
No Drawing. Filed Mar. 31, 1965, Ser. No. 444,473
1 Claim. (Cl. 23—110)

ABSTRACT OF THE DISCLOSURE

Synthetic water-swellable hectorite material is mixed with synthetic non-water-swelling mica or amphibole material. The mixture is fused and slowly cooled to form a pig containing hectorite and large crystals of the mica or ampibole. Subsequently, the hectorite is swelled into a mush with water, and large, intact, individual crystals of mica or amphibole are separated from the mush.

---

The invention herein described and claimed may be manufactured and used by or for the Government of the United States of America for govermental purposes without the payment of royalties thereon or therefor.

This invention relates to novel fluor-silicate compositions of micas and amphiboles and to novel methods for manufacturing these compositions. Further, the invention relates to methods for crystallizing fluor-mica or fluor-amphibole by melting these materials together with a fluor-hectorite material and cooling the fused mass to produce a two-phase system which may be easily separated by treatment with water-containing fluid to swell the hectorite phase and produce relatively large silicate crystals.

Accordingly, it is an object of this invention to obtain new crystal compositions of fluor-mica and fluor-amphibole, and to obtain new compositions contaning these synthetic minerals in a two-phase system with a water-swelling lithium fluor-hectorite material. It is a further object of this invention to present novel methods for manufacturing these crystals and two-phase compositions in which the fluro-mica forming and fluor-amphibole-forming materials are admixed with fluor-hectorite-forming material and melted in a furance to produce a uniform melt composition, and thereafter cooled below the crystallization temperature of the fluor-mica or fluor-amphibole crystals.

Mica being the more important species of the present invention, attention will be focused on its properties and manufacture. Natural micas such as muscovite and phlogopite contain water of constitution present as OH radicals. Natural mica crystals as found have a stratified layer structure which permits splitting the mica into thin flexible particles. It is impervious to fire, water, acid or electrical current. Therefore, these unique properties make mica a desirable dielectric material for such things as electric motors, spark plugs, and electric appliances.

Natural mica is extremely variable as to purity and renders quality control difficult; and the labor involved in the mechanical splitting of the blocks found in nature contributes greatly to its expense. Consequently, a large amount of research has been devoted to developing a suitable synthetic non-hydroxyl mica having superior properties, and resulting fluor-phlogopite micas have excellent chemical and electrical characteristics. One major problem with the fluor-phlogopites of the prior art workers, however, has been the splitting of the micas into large, commercially-usable crystals.

Water swelling has proved a valuable process for splitting natural mica into small thin crystals for use in mica paper manufacture; but, no synthetic fluor-phlogopite has been produced until the present invention which is amenable to a simple water-swelling technique for splitting.

Silicate crystals of the fluor-pholgopite and fluor-amphibole types are manufactured by a fusion and crystallization process which produces a pig or ingot of the mineral, which must be split or mined to obtain the thin crystals necessary for commercial use. This involves tedious and expensive manual steps which are very time-consuming. According to the methods of this invention the splitting step is greatly simplified by providing the fluor-silicate mineral crystals in a two-phase system, one phase of which may be water-swelled to release the product from the pig. This is accomplished by crystallizing the fluor-phlogopite or fluor-amphibole material in a lower-melting mineral such as a lithium fluor-hectorite material, whereby the crystal properties of the product may be controlled by the cooling rate in a liquid phase.

The fusion step may be carried out in any furnace capable of reaching the required temperatures and resistant to the fused minerals at high temperatures. One such furance is described by Humphrey in U.S. Patent 2,711,435. The Humphery furnace is used to produce minerals such as fluor-phlogopite at high temperatures, about 1400° C., by electrically melting the raw batch of fluor-silicate-forming minerals that are charged into the furnace. The charged minerals may be in any crystalline form at the initial melting stage, so long as the raw batch contains the proper proportions of constituents to be capable of forming the desired fluor-mica or fluor-amphibole product.

The composition for fluor-phlogopite micas varies considerably in the art. Normal fluor-phlogopite has the formula: $KMg_3AlSi_3O_{10}F_2$. The potassium can be replaced by other cations, such as Rb, Ca, Ba, etc. Magnesium and aluminum may be replaced by other cations such as Fe, Mn, Ti, Li, etc. Also some variation is permissible in the ratio of Si to Al. No known substitute for fluorine in the lattice has been developed for synthetic non-hydroxyl micas; however, it has been suggested by prior art workers that chlorine might possibly replace the fluorine atoms partially, and one such example appears herein.

Other non-hydroxyl synthetic micas are lithium tetrasilicic fluor-phlogopite ($KMg_2LiSi_4O_{10}F_2$) and barium disilicic fluor-phlogopite ($BaMg_3Al_2Si_2O_{10}F_2$). Various melting points have been attributed to these fluor-micas, mostly in the range of 1150° to 1475° C. These minerals may be crystallized using the Humphery method and the starting batch of materials may be previously-crystallized synthetic mica or raw constituents such as oxides and fluorides, or mixtures of these. In the following description the term "fluor-mica material" will be used to indicate mica and those raw materials combinable to form micas. This same terminology will be extended to embrace the terms "fluor-amphibole material" and "fluor-hectorite material."

Natural amphiboles are a group of asbestos-like silicate minerals with similar physical properties, chemical composition and structure. The natural mineral has hydroxyl units, as does natural mica. The synthesis of a fluor-amphibole from the proper mole ratios of raw material is possible using the Humphery method. The raw batch is made up of certain proportions of soda ash, calcium carbonate, magnesia, alumina, silica, and magnesium fluoride.

The most important part of this invention lies in the discovery of certain water-swelling hectorites and their ability to crystallize fluor-silicates at high temperatures. These hectorites are completely miscible with the fluormicas and fluor-amphiboles above the melting point of the latter minerals, but give a distinct two-phase system below that temperature. This mechanism is different from the process in U.S. Patent 3,011,868, which discloses a method for recrystallizing synthetic mica by dissolving the material in a lead borate bath and partially crystallizing at successively lower temperatures over a gradually-declining solubility curve. Apparently, the fluor-silicates are substantially insoluble in hectorite below their own melting points, and the crystallization occurs at a single temperature.

Natural hectorite $Mg_{2.67}Li_{0.33}Si_4O_{10}(OH)_2$ contains hydroxyl groups in the same manner as natural micas and amphiboles, and also has wide variations in the ratio of Mg to Li. The synthetic hectorite preferred for the purposes of this invention is a fluorine-containing mineral consisting essentially of magnesia, silica, and lithium fluoride, in varying proportions. The only essential characteristic of the hectorite is that it have the capacity to water-swell after the fluor-silicate crystallization step. The preferred fluor-hectorites have a melting point of about 950° C.

In accordance with the concept of this invention a raw batch of minerals in the proper ratio of constituents to form a mica such as fluor-phlogopite or to form a fluor-amphibole is mixed with a raw batch of minerals to form a fluor-hectorite water-swelling compound and the resulting combined batch is heated to the fusion point of the higher-melting component. The ratio of batches may be varied widely within the scope of this invention; however, it has been found that the range of 0.5 to 2 parts by weight of fluor-mica or fluor-amphibole to one part by weight of hectorite is satisfactory.

The heating step is carried out in the Humphrey furnace using internal electrical resistance as the power source. The combined batch is melted and should be maintained above the fusion point for sufficient time to obtain a completely homogeneous melt. The soak period will usually be in the 1 to 10 hour range, depending on the size of the melt.

The resulting uniform melt composition is cooled below the fusion point to begin the crystallization step. The cooling rate determines the crystal size of the final product, and this rate may be controlled by lowering the power input when the Humphrey furnace is used. A crystallization temperature of about 1360° C. is typical in the instant process, and slow cooling at about this point will result in larger, more valuable crystals. The mixture comprises a solid product phase and a liquid hectorite phase between the product fusion point and the melting point of the hectorite (about 950° C.). Below this temperature a two-phase solid system is present.

The two-phase composition comprising a fluor-mica or fluor-amphibole silicate crystal product phase and a hectorite phase represents a valuable product in itself, since the water-swelling step may be carried out at a different time and place from the synthesis steps above.

The water-swelling step may be carried out by any process which permits the contact of the pig with aqueous fluid. The fluid may be in the form of ordinary tap water, aqueous solutions, steam, or water-bearing gases such as moist air. The temperature of the swelling is not critical, but normal ambient temperatures are preferred, with water in the liquid form between 0° and 100° C. Wide variations are permissible in the ratio of water to fluor-silicate; normally the range of 5 to 20 parts of water by weight per part of silicate is used, with the preferred ratio of 10 to 1. The time necessary to swell the hectorite depends on the composition, temperature, pig size, etc.; a 100 gram pig may take only 20 minutes; a 100 pound pig, 6 hours; and a 10 ton pig, up to 60 hours.

The following examples are given to illustrate the invention, and are not intended to limit the scope of the concept.

*Example 1*

An example of a fluor-phlogopite synthetic mica manufactured by the new process:

| Fluor-mica material: | Parts by weight |
|---|---|
| Potassium silico fluoride ($K_2SiF_6$) | 20.30 |
| Alumina ($Al_2O_3$) | 7.59 |
| Magnesia (MgO) | 30.47 |
| Silica ($SiO_2$) | 19.30 |
| Potash feldspar ($KAlSi_3O_8$) | 26.00 |
| Boron oxide ($B_2O_3$) | 1.00 |
| Potassium chloride (KCl) | 0.75 |
| | 105.41 |

| Fluor-hectorite material: | |
|---|---|
| Lithium fluoride (LiF) | 24.33 |
| Magnesia (MgO) | 19.12 |
| Silica ($SiO_2$) | 56.54 |
| | 99.99 |

Note: The above fluor-hectorite material may also be termed lithium hectorite, and represents the preferred embodiment of the fluor-hectorite material only. The ratio of Mg to Li may be varied widely within the scope of this invention. The particular lithium hectorite compound used has a formula: $(4LiF)Li_2Mg_4Li_2Si_8:O_{20}F_4$.

The above materials were admixed in equal parts by weight of fluor-phlogopite material to hectorite material and the batch was heated to 1390° C. and soaked to assure uniform melt composition. The melt was then cooled to 1360° C. to crystallize fluor-phlogopite mica. The cooled mass had two phases, one mica and one hectorite, and the crystals appeared to be about one-eighth inch in thickness. The pig was then immersed in water in a tank at room temperature to swell the hectorite. The hectorite swelled into a mush-like condition, while the larger crystals of fluor-phlogopite remained intact and were removed from the mush without damage.

Most of the resulting crystals from the above process are about one-half inch in diameter and about 0.001 inch in thickness. Crystals about 1.5 inches in diameter or larger, may be grown by this process depending on the cooling cycle. The fluor-phlogopite mica of this example had an empirical formula of $$K_{1.69}Na_{.06}Li_{.07}Mg_{5.20}Li_{.80}Al_{1.11}Si_{6.89}:O_{19.90}F_{4.13}$$

and had the following composition:

| Component: | Weight percent |
|---|---|
| $SiO_2$ | 49.58 |
| $Al_2O_3$ | 6.76 |
| MgO | 25.09 |
| $LiO_2$ | 1.55 |
| $Na_2O$ | 0.25 |
| $K_2O$ | 9.50 |
| F | 9.40 |

The following optical data was taken on the product crystals: 23 C.; biaxial (−);

| Alpha | −1.521±.003 |
|---|---|
| Beta | −1.545±.003 |
| Gamma | −1.545±.003 |
| Birefringence | .024 |

This data compared with known optical data for fluor-phlogopite.

*Example 2*

The same raw batch materials were used as in Example 1 except that the weight ratio of 40% fluor-phlogopite material to 60% fluor-hectorite material was used. The 400 pound pig was melted and cooled as in the previous example and water-swelled in 12 hours to yield very thin crystals about 0.25 inch in diameter.

Example 3

The same raw batch materials were used as in Example 1 except that the weight ratio of 66.66% fluor-phlogopite material to 33.33% fluor-hectorite material was used. Larger mica crystals were grown, but poor water-swelling properties resulted.

Example 4

An example of fluor-amphibole manufactured by the new process:

| Fluor-amphibole material: | Parts by weight |
|---|---|
| Soda ash ($Na_2CO_3$) | 5.59 |
| Calcium carbonate ($CaCO_3$) | 21.12 |
| Magnesia (MgO) | 17.00 |
| Alumina ($Al_2O_3$) | 5.38 |
| Silica ($SiO_2$) | 44.34 |
| Magnesium fluoride ($MgF_2$) | 6.57 |
| | 100.00 |

| Fluor-hectorite material: | |
|---|---|
| Lithium fluoride (LiF) | 24.33 |
| Magnesia (MgO) | 19.12 |
| Silica (SiO) | 56.54 |
| | 99.99 |

A weight ratio of 50% fluor-amphibole material to 50% fluor-hectorite was used. The batch was melted at 1400° C. and soaked for an hour. The water-swelled pig yielded fluor-amphibole crystals having the formula:

$$NaCa_2 \cdot Mg_5AlSi_7 : O_{20}F_2$$

The invention has been illustrated by specific examples but there is no intent to limit the invention to the specific details disclosed except insofar as set forth in the following claim.

What is claimed is:

A method for producing large non-water-swellable fluor-phlogopite crystals comprising:
(a) heating a mixture of a water swellable lithium fluor-hectorite material and a non-water-swellable potassium- and aluminum-containing fluor-phlogopite material to a temperature of at least 1365° C., said hectorite having a lower fusion point than said fluor-phlogopite, said materials being present in a weight ratio of about 0.5 to 2 parts fluor-phlogopite per part hectorite;
(b) slowly cooling said heated mixture to produce a mixture of said large fluor-phlogopite crystals and said water-swellable hectorite crystals;
(c) contacting said mixture with aqueous fluid to swell said hectorite crystals; and
(d) separating said large fluor-phlogopite crystals from said swelled hectorite.

References Cited

UNITED STATES PATENTS 2,778,713  1/1957  Noda _____ 23—110

FOREIGN PATENTS 659,415  3/1963  Canada.
901,739  7/1962  Great Britain.

OTHER REFERENCES

Johnson et al., "Water Swelling Synthetic Fluormicas and Fluormontmorillonoids," Bur. of Mines Report 6235, pps. 4–17 relied on.

OSCAR R. VERTIZ, Primary Examiner.

MILTON WEISSMAN, Examiner.

A. J. GREIF, Assistant Examiner.